(12) United States Patent
Lees et al.

(10) Patent No.: US 9,078,417 B1
(45) Date of Patent: Jul. 14, 2015

(54) PET WASTE AND PERSONAL ITEMS POUCH SYSTEM

(71) Applicants: Phill Lees, Concord, CA (US); Kyle Lees, Concord, CA (US)

(72) Inventors: Phill Lees, Concord, CA (US); Kyle Lees, Concord, CA (US)

(*) Notice: Subject to any disclaimer, the term of this patent is extended or adjusted under 35 U.S.C. 154(b) by 66 days.

(21) Appl. No.: 14/106,331

(22) Filed: Dec. 13, 2013

Related U.S. Application Data

(60) Provisional application No. 61/738,196, filed on Dec. 17, 2012.

(51) Int. Cl.
*A01K 23/00* (2006.01)

(52) U.S. Cl.
CPC .................. *A01K 23/005* (2013.01)

(58) Field of Classification Search
CPC .......................... A01K 27/003; A01K 27/008
USPC .................... 119/161, 769, 770, 795
See application file for complete search history.

(56) References Cited

U.S. PATENT DOCUMENTS

| | | | |
|---|---|---|---|
| 5,441,017 A | 8/1995 | Lindsay | |
| 5,560,321 A * | 10/1996 | Hess | 119/858 |
| D393,504 S | 4/1998 | Eisman | |
| 5,839,932 A * | 11/1998 | Pierce et al. | 441/80 |
| 5,890,637 A * | 4/1999 | Furneaux | 224/191 |
| 6,035,809 A * | 3/2000 | Fingerett et al. | 119/796 |
| 7,073,462 B1 * | 7/2006 | Layman | 119/161 |
| D651,767 S | 1/2012 | Dias | |
| 2004/0200438 A1 * | 10/2004 | Jeffrey | 119/858 |
| 2006/0054107 A1 | 3/2006 | Baker | |
| 2008/0098966 A1 * | 5/2008 | Knoblach | 119/855 |
| 2009/0095225 A1 * | 4/2009 | O'Connell | 119/161 |
| 2010/0095903 A1 * | 4/2010 | Garcia | 119/770 |
| 2011/0155076 A1 * | 6/2011 | Charette | 119/795 |
| 2012/0186539 A1 | 7/2012 | Johnston | |

* cited by examiner

*Primary Examiner* — Monica Williams
(74) *Attorney, Agent, or Firm* — RG Patent Consulting, LLC; Rachel Gilboy

(57) ABSTRACT

A pet waste and personal items pouch system allowing pet owners to take their pet for a walk and carry all necessary pet accessories, including empty waste bags, and personal items in a hands-free manner while also being able to place solid pet waste in a waste bag and carry it in a quick release compartment until the pet owner is able to conveniently dispose of the waste without touching the waste bag twice.

1 Claim, 8 Drawing Sheets

PET WASTE AND PERSONAL ITEMS POUCH SYSTEM

CROSS-REFERENCE TO RELATED APPLICATION

The present application is related to and claims priority from prior provisional application Ser. No. 61/738,196 filed Dec. 17, 2012 which application is incorporated herein by reference.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of pouches and pet accessories and more specifically relates to a pet waste and personal items pouch system.

2. Description of the Related Art

Many pet owners, and especially dog owners, enjoy taking their pet for walks in their neighborhood, in parks, and virtually everywhere they go. Sometimes the walk is done at a leisurely pace and other times the pace is more brisk. For sanitary reasons these pet owners understand that they need to collect any waste their pet deposits. Many times the pet owners carry their own collection bags and equipment. Many neighborhoods have constructed waste stations encouraging the pet owner to retrieve a collection bag for their pet's waste and use the station to dispose of the waste.

However, many times the pet owner will carry their own collection bags and other items they may wish to use during the walk, including car and house keys, a hand sanitizer and toys for their pet. Additionally, in our multi-tasking culture, many people carry their cell phones, tablets, and other small electronics, such as MP3 players, with them wherever they go including when they are walking their pet. Sometimes the pet owner wears clothing with pockets to accommodate these devices, and other times they are wearing clothing without pockets. Whether the pet owner is wearing clothing with pockets or not, they often feel frustrated trying to handle everything at the same time while trying to watch their pet continually. Individuals need a means to carry all their personal items and whatever they use for their pet and an easy, sanitary way to handle any waste issues.

Various attempts have been made to solve the above-mentioned problems such as those found in U.S. Pat. No. 6,035,809 to Allison Marie Fingerett et al., U.S. Pub No. 2006/0054107 to Sandra L. Baker, U.S. Pat. No. D393,504 to Janice S. Elsman, U.S. Pat. No. D651,767 to Julie A. Dias, U.S. Pub. No. 2012/0186539 to Kenny A. Johnston, and U.S. Pat. No. 5,441,017 to Joseph M. Lindsay. This art is representative of pet accessories. None of the above inventions and patents, taken either singly or in combination, is seen to describe the invention as claimed.

Ideally, a pet waste and personal items pouch system should provide the ability to easily and accessibly hold materials used for waste collection and personal items and, yet would operate reliably and be manufactured at a modest expense. Thus, a need exists for a reliable pet waste and personal items pouch system to avoid the above-mentioned problems.

BRIEF SUMMARY OF THE INVENTION

In view of the foregoing disadvantages inherent in the known pouch art, the present invention provides a novel pet waste and personal items pouch system. The general purpose of the present invention, which will be described subsequently in greater detail, is to provide a pet waste and personal items pouch system allowing pet owners to take their pet for a walk and carry all necessary pet accessories, including empty waste bags, and personal items in a hands-free manner while also being able to place solid pet waste in a waste bag and carry it in a compartment until the individual is conveniently able to dispose of the waste.

A pet waste and personal items pouch system is disclosed herein, in a preferred embodiment, comprising a deluxe-pouch-body-assembly comprising in combination a front-panel and a rear-panel, each having an inside-surface, an outside-surface, and a quick-release-opening-perimeter comprising hook-and-loop (or other suitable fastening means) on the inside-surface. The deluxe-pouch-body-assembly further comprises a plurality of compartments on the outside surface of the front-panel, a pull-tab on the outside surface of the front-panel, and a plurality of fastening-straps.

The front-panel and the rear-panel each comprise a reflective-safety-ribbon fixedly attached to the outside surface of the front-panel and the outside surface of the rear-panel. Motorists can visually notice the reflective-safety-ribbon when a user is walking a pet during darkened conditions for added safety. The front-panel comprises a side-loop on a side of the front-panel comprising a loop opening for holding a spring lock useful for holding a ring of keys.

The plurality of compartments on the outside surface of the front-panel comprises at least a first-compartment, a second-compartment, a third-compartment, and a fourth-compartment, and are able to contain empty waste bags, pet accessories and personal items. The first-compartment, second-compartment and fourth compartment preferably has openings comprising hook-and-loop (such as VELCRO®).

The first-compartment comprises a first-compartment-opening and a first-compartment-inner-volume able to contain desired personal items. The second-compartment adjacent to the first-compartment comprises a second-compartment-opening having a zipper (or other suitable fastening/opening/closing means) and a second-compartment-inner-volume able to contain desired personal items. The second-compartment further comprises a mesh-front-surface enabling the user to see personal items contained within the second-compartment-inner-volume. Items may be switched between compartments, as well as suitable fastening, openings, and closing means.

The third-compartment comprises a third-compartment-opening and a third-compartment-inner-volume able to contain unused waste bags. The third-compartment further comprises a dispenser-eyelet through which unused waste bags can be pulled one-by-one delivered in a 'pseudo-linked series' from a waste-bag-storage-cylinder placed in the third-compartment-inner-volume. The unused waste bags are useful for holding pet-waste as needed. The waste-bag-storage-cylinder comprises a tubular shaped cylinder having a cylinder-volume, a cylinder-bottom-surface, a side-cylinder-opening, and a cylinder cap fitting on a cylinder-top-opening.

The fourth-compartment comprises a fourth-compartment-opening and a fourth-compartment-inner-volume able to contain desired personal items as per user-preference.

A top-edge of the front-panel and a top-edge of the rear-panel, preferably being held in place by hook-and-loop, is able to be opened by separating the top-edge of the front-panel and the top-edge of the rear-panel to allow the user to place waste bags when filled into a panels-compartment-volume created when the user separates the top-edge of the front-panel from the top-edge of the rear-panel.

The pull-tab on the outside surface of the front-panel is able to be used by the user to quickly and conveniently separate the bottom edge of the front-panel from the bottom edge of the rear-panel by pulling the pull-tab and releasing the quick-release-opening-perimeter. Thus, the user is able to dispose of the waste bags when filled by allowing them to fall out through the pouch opening created by separating the bottom edge of the front-panel from the bottom edge of the rear-panel.

When in use, the user is able to place desired pet accessories and desired personal items into the plurality of compartments as desired, and insert a belt through the plurality of fastening-straps to wear the pouch-body-assembly on a waist and take a pet for a walk having easy access to personal items, pet accessories and empty waste bags when needed. When the pet creates solid waste, the user is able to place the pet waste in an empty waste bag retrieved from the dispenser-eyelet on the third-compartment and place the waste bag when filled into the quick-release panels-compartment-volume for later disposal.

The present invention holds significant improvements and serves as a pet waste and personal items pouch system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention, which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures that accompany the written portion of this specification illustrate embodiments and method(s) of use for the present invention; pet waste and personal items pouch system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a pouch (as a pet accessory) and more particularly to a pet waste and personal items pouch system as used to improve the ability of a user to carry personal items and pet accessories, along with waste bags for solid waste, in a pouch that may be worn on a belt.

Generally speaking, many pet owners enjoy taking a pet for a walk providing exercise for both the pet owner and the pet. The pet owner usually wants to carry pet accessories, personal items and empty waste bags. However, if can be difficult to carry everything desired without having some kind of carrier apparatus. Further pet owners want an easy way to handle pet waste and dispose of it in a clean and healthy manner. The pet waste and personal items pouch system disclosed herein provides these pet owners with a pouch having a plurality of compartments able to hold the many items the pet owner may wish to take along and a method for handling the pet waste in a hands free manner.

Figure 1:
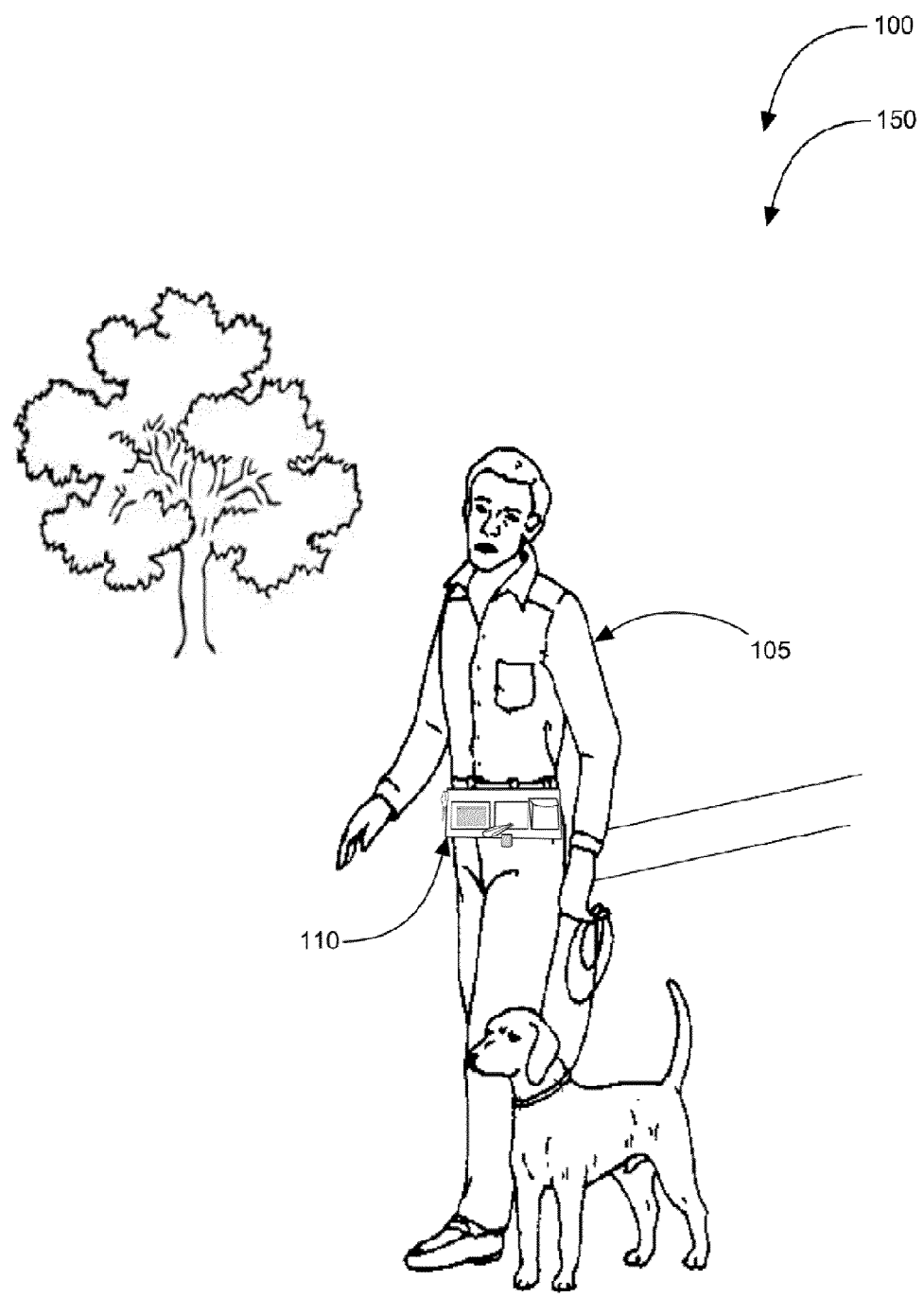
FIG. 1 shows a perspective view illustrating a pet waste and personal items pouch system in an in use condition according to an embodiment of the present invention.

Referring to the drawings by numerals of reference there is shown in FIG. 1, pet waste and personal items pouch system 100 in an in use condition according to an embodiment of the present invention.

Pet waste and personal items pouch system 100 in a preferred embodiment, comprises deluxe-pouch-body-assembly 110 comprising in combination front-panel 112 and rear-panel 114, each having inside-surface 116, outside-surface 118, and quick-release-opening-perimeter 120 comprising hook-and-loop on inside-surface 116 of front-panel 112 and on inside-surface 116 of rear-panel 114. Deluxe-pouch-body-assembly 110 further comprises plurality of compartments 160 on outside-surface 118 of front-panel 112, pull-tab 130 on outside-surface 118 of front-panel 112, and plurality of fastening-straps 190. Each of fastening-straps 190 comprises strap-first-end 191 and strap-second-end 192. Deluxe-pouch-body-assembly 110 comprises flexible fabric material allowing user 105 to manipulate deluxe-pouch-body-assembly 110 by folding, bending and so forth. Various fabrics and non-fabrics may be used.

When in use, user 105 is able to place desired pet accessories and desired personal items into plurality of compartments 160 as desired, and insert a belt through plurality of fastening-straps 190 to wear deluxe-pouch-body-assembly 110 on a waist (as shown) and take a pet for a walk having easy access to personal items, pet accessories and empty waste bags 107 accessible when needed. Deluxe-pouch-body-assembly 110 can also be removably attached to pet leash 195 for use if desired via use of fastening-straps 190. When the pet creates solid waste (defecates), user 105 is able to place the pet waste in an empty waste bag 107 retrieved from dispenser-eyelet 173 on third-compartment 172 and place waste bag 107 when filled into quick release panels-compartment-volume 122 for later disposal The use of deluxe-pouch-body-assembly 110 allows user 105 to walk a pet and carrying all desired personal items and pet accessories in a hands-free manner greatly increasing user's 105 ability to walk, jog, or run with pet to increase the amount of exercise for both user 105 and the pet. Additionally, user 105 is able to carry all desired personal items and pet accessories, and remove bagged pet waste from deluxe-pouch-body-assembly 110 without having to touch the filled bag twice.

Figure 2:
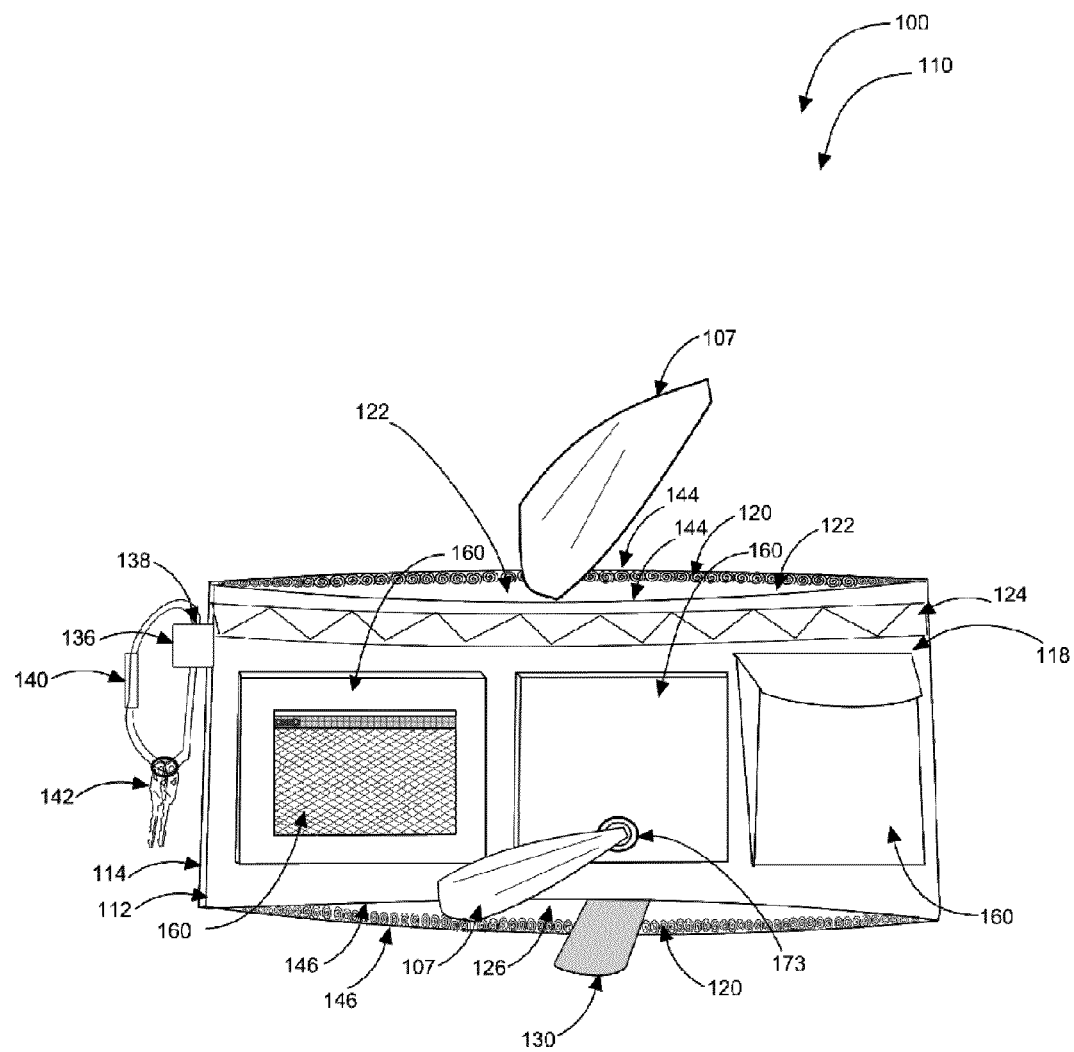
FIG. 2 is a perspective view illustrating a deluxe-body-assembly according to an embodiment of the present invention of FIG. 1.

Referring now to FIG. 2, a perspective view illustrating deluxe-body-assembly 110 according to an embodiment of the present invention of FIG. 1.

Front-panel 112 and rear-panel 114 each comprise reflective-safety-ribbon 124 fixedly attached to outside-surface 118 of front-panel 112 and outside-surface 118 of rear-panel 114. Reflective-safety-ribbon 124 is able to be visually seen (easily noticed) by motorists when user 105 is walking a pet during darkened conditions thereby allowing motorists to give a reasonable amount of space between their vehicle and user 105 walking a pet. Front-panel 112 comprises side-loop 136 on a side of front-panel 112 comprising loop-opening 138 for holding spring lock 140 useful for holding ring of keys 142. Other suitably equivalent means for fastening may be used with the present invention such as for example snaps, clips and the like.

Plurality of compartments 160 on outside surface 118 of front-panel 112 comprises at least first-compartment 161, second-compartment 165, third-compartment 170 and fourth-compartment 175, and are able to contain empty waste bags 107, pet accessories and personal items. First-compartment 161, third-compartment 170 and fourth-compartment 175 have openings preferably comprising hook-and-loop. Openings for first-compartment 161, third-compartment 170 and fourth-compartment 175 may be closed and fastened (and opened when desired via manipulation) using other fasteners such as snaps, zippers, and buttons.

Top-edge 144 of front-panel 112 and top-edge 144 of rear-panel 114, being held in place by hook-and-loop, is able to be opened by user 105 by separating top-edge 144 of front-panel 112 and top-edge 144 of rear-panel 114 to allow user 105 to place waste bags 107 when filled into quick-release panels-compartment-volume 122 created when user 105 separates top-edge 144 of front-panel 112 from top-edge 144 of rear-panel 114.

Pull-tab 130 on outside-surface 118 of front-panel 112 is able to be used by user 105 to quickly separate bottom edge 146 of front-panel 112 from bottom edge 146 of rear-panel 114 by pulling pull-tab 130 outward and releasing quick-release-opening-perimeter 120. Thus, user 105 is able to dispose of waste bags 107 when filled in a hands-free manner by allowing waste bags 107 when filled to fall out through quick-release pouch-opening 126 created by separating bottom edge 146 of front-panel 112 from bottom edge 146 of the rear-panel 114.

Figure 3A:
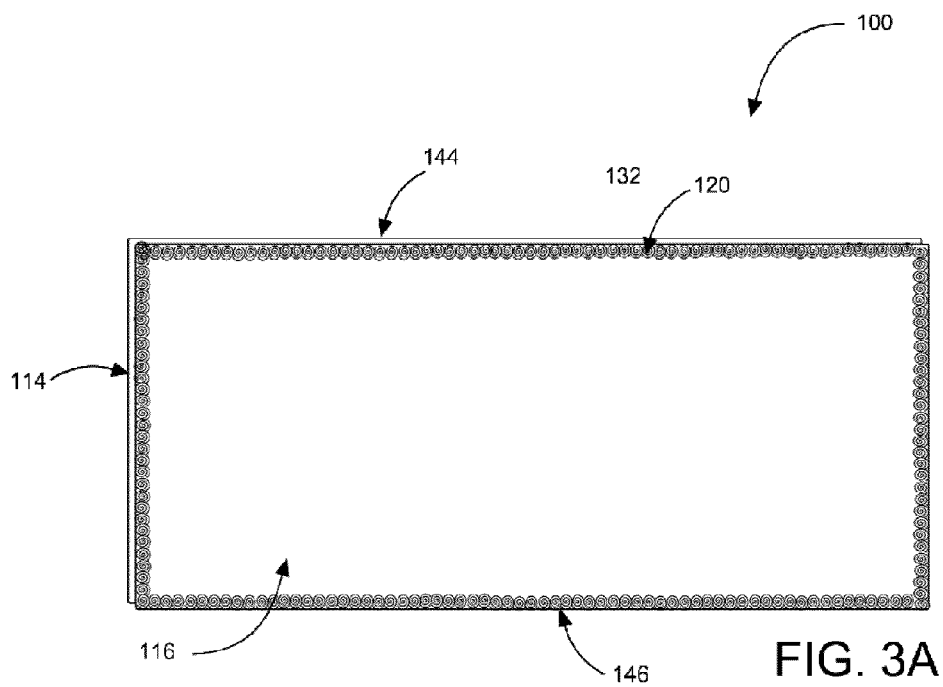
FIG. 3A is a perspective view illustrating an inside surface of a rear-panel of the deluxe-body-assembly according to an embodiment of the present invention of FIG. 1.

Referring now to FIG. 3A, a perspective view illustrating inside-surface 116 of rear-panel 114 of deluxe-body-assembly 110 according to an embodiment of the present invention of FIG. 1. Rear-panel 114 comprises quick-release-opening-perimeter 120 comprising hook-and-loop surrounding inner-surface 116.

Figure 3B:
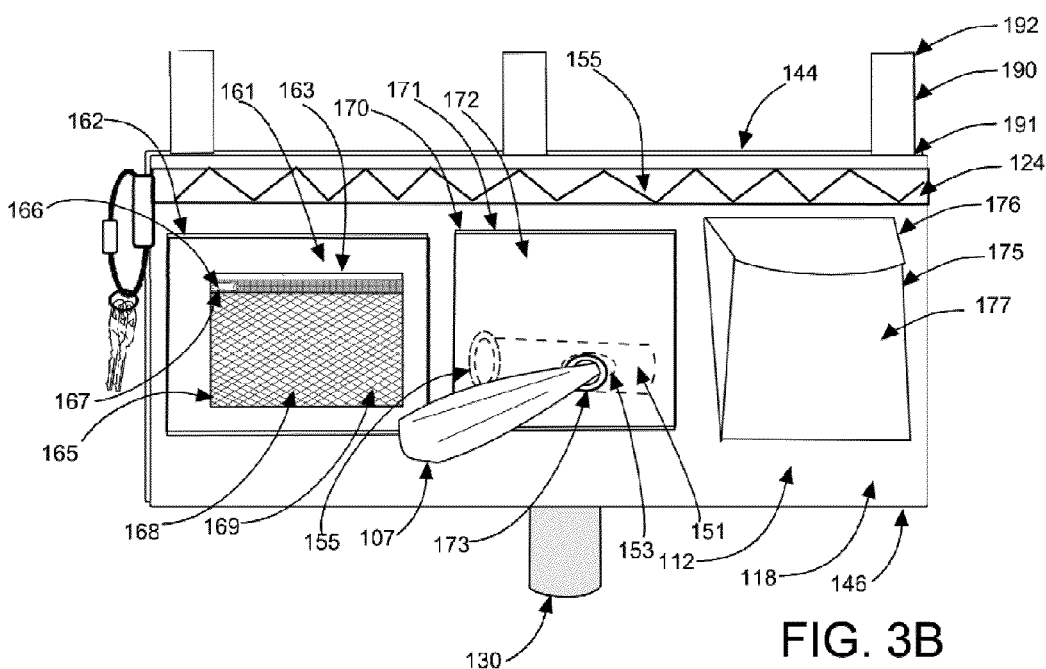
FIG. 3B is a perspective view illustrating an outside surface of a front-panel of the deluxe-body-assembly according to an embodiment of the present invention of FIG. 1.

Referring now to FIG. 3B, a perspective view illustrating outside-surface 118 of front-panel 112 of deluxe-body-assembly 110 according to an embodiment of the present invention of FIG. 1.

First-compartment 161 comprise first-compartment-opening 162 and first-compartment-inner-volume 163 is able to contain desired personal items such as a cell phone or pet accessories and treats. Second-compartment 165 adjacent to first-compartment 162 comprise second-compartment-opening 166 having zipper 167 and second-compartment-inner-volume 168 is able to contain desired personal items. Second-compartment 165 further comprise mesh-front-surface 169 enabling user 105 to see personal items contained within second-compartment-inner-volume 168.

Third-compartment 170 comprise third-compartment-opening 171 and third-compartment-inner-volume 172 able to contain unused waste bags 107 and other items such as hand sanitizer and scoopers for picking up solid waste. Third-compartment 170 further comprises dispenser-eyelet 173 measuring approximately ¾inch through which unused waste bags 107 are able to be pulled one-by-one delivered in a pseudo-linked series from waste-bag-storage-cylinder 151 placed horizontally in third-compartment-inner-volume 172. Unused waste bags 107 may be kept in waste-bag-storage-cylinder 151 preferably having a cylindrical shape with a volume, side centered-cylinder-opening 153, and cylinder cap 155 useful for holding pet-waste as needed.

Fourth-compartment 175 comprises fourth-compartment-opening 176 and fourth-compartment-inner-volume 177 able to contain desired personal items or pet accessories. As previously mentioned, items may be held in different parts of the present invention as desired.

Front-panel further comprises plurality of fastening-straps 190, each of fastening-straps 190 having strap-first-end 192 and strap-second-end 191. Strap-first-end 192 is releasably attachable via hook-and-loop to top-surface 184 of belt-loops 182 on outside-surface 118 of rear-panel 114. Strap-second-end 191 is fixedly attached to outside-surface 118 of front-panel 112. Fastening-straps 190 are useful for suspending deluxe-pouch-body-assembly 110 from pet leash 195 or user's belt loops.

Figure 4A:
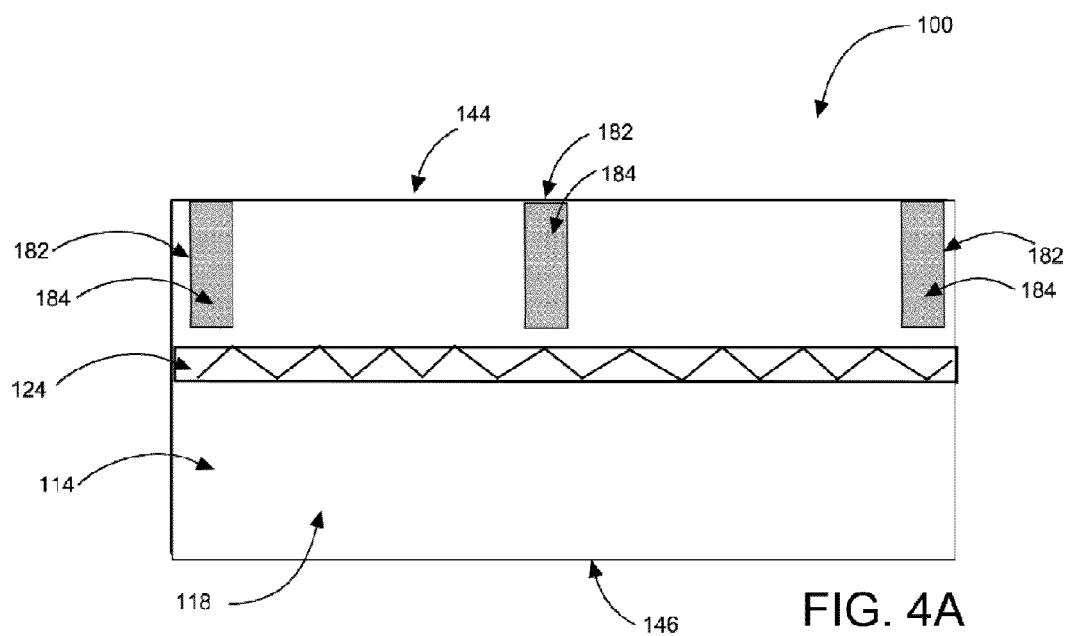
FIG. 4A is a perspective view illustrating an outside surface of a rear panel of the deluxe-body-assembly according to an embodiment of the present invention of FIG. 1.

Referring now to FIG. 4A, a perspective view illustrating outside-surface 118 of rear panel 114 of deluxe-body-assembly 110 according to an embodiment of the present invention of FIG. 1.

Deluxe-body-assembly 110 may further comprise plurality of belt-loops 182 in a preferred embodiment. Plurality of belt-loops 182 comprise three belt-loops 182, each of belt-loops 182 fixedly attached to outside-surface 118 of rear-panel 114 having a connection means comprising hook-and-loop on top-surface 184. Belt-loops 182 allow user 105 to wear deluxe-body-assembly 110 on a belt around a waist of user 105 by inserting a belt through each of belt-loops 182.

Rear-panel 114 comprises reflective-safety-ribbon 124 fixedly attached to outside-surface 118 of rear-panel 114, reflective-safety-ribbon 124 able to be seen by motorists when user 105 is walking a pet during darkened conditions. This feature promotes safety in use.

Figure 4B:
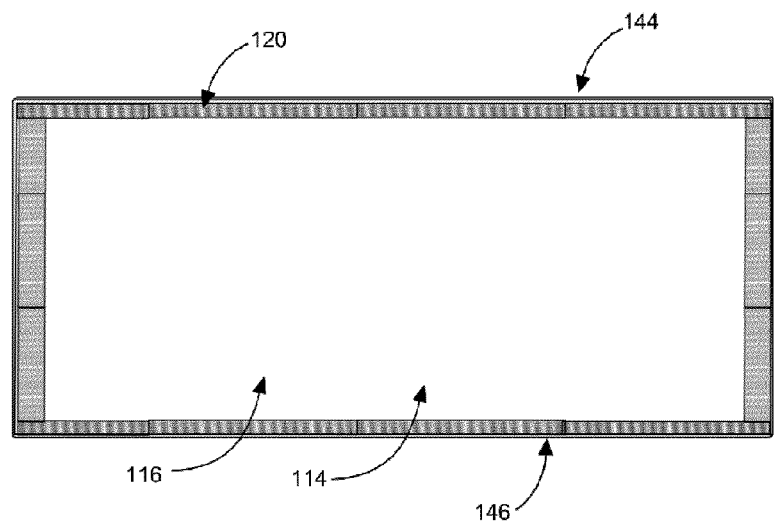
FIG. 4B is a perspective view illustrating an inside surface of a rear panel of the deluxe-body-assembly according to an embodiment of the present invention of FIG. 1.

Referring now to FIG. 4B, a perspective view illustrating inside surface 116 of rear panel 114 of deluxe-body-assembly 110 according to an embodiment of the present invention of FIG. 1. Inside-surface 116 of deluxe-body-assembly 110 rear-panel 114 comprises quick-release-opening-perimeter 120 comprising hook-and-loop surrounding inner-surface 116.

Figure 5:
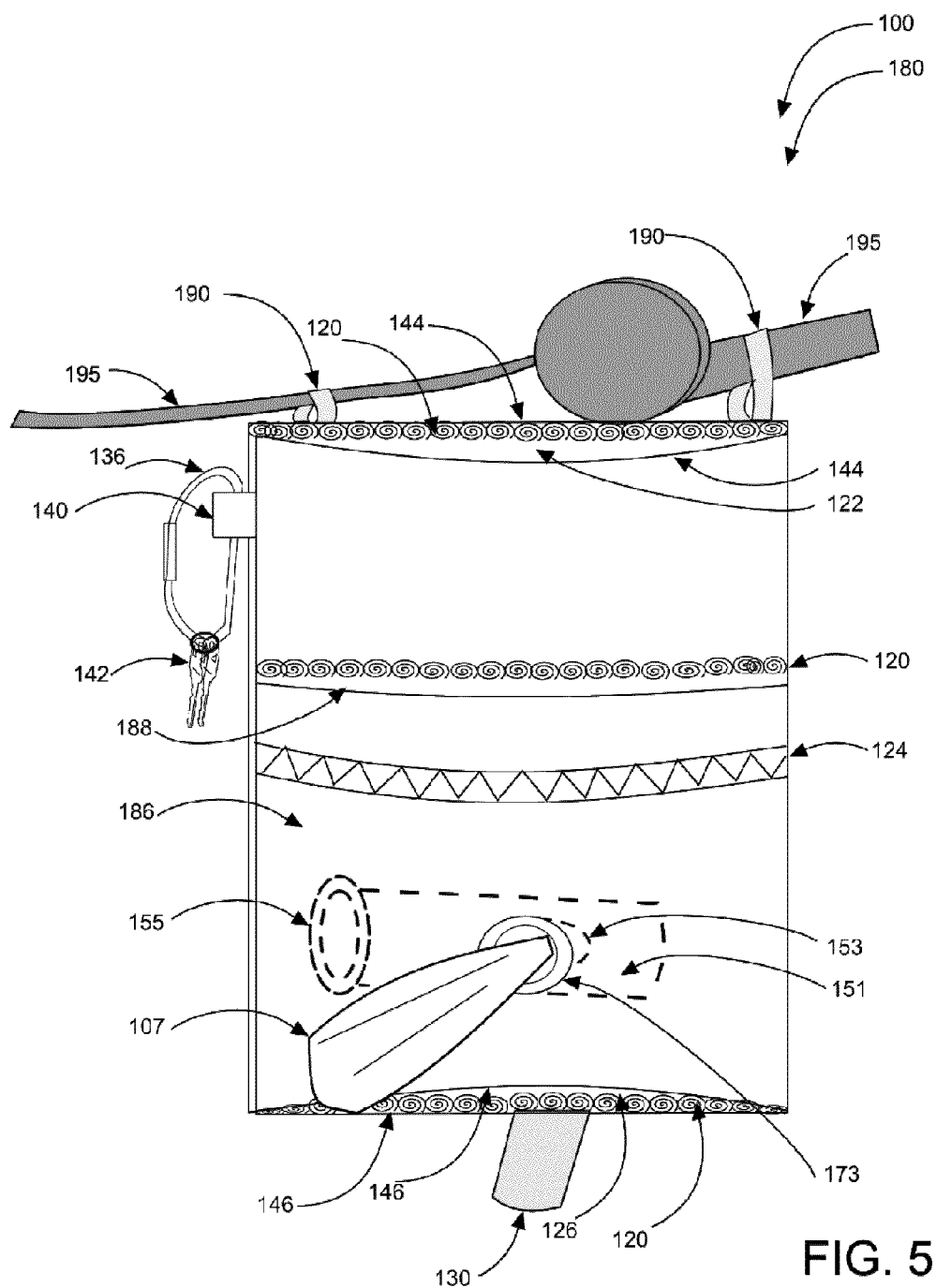
FIG. 5 is a perspective view illustrating a mini-body-assembly according to an embodiment of the present invention.

Referring now to FIG. 5, a perspective view illustrating mini-body-assembly 180 according to an embodiment of the present invention.

Pet waste and personal items pouch system 100, in an alternate embodiment, may comprise mini-pouch-body-assembly 180. Mini-pouch-body-assembly 180 comprises in combination front-panel 112, rear-panel 114, each having inside-surface 116, outside-surface 118, and quick-release-opening-perimeter 120 comprising hook-and-loop on inside-surface 116.

When in use (as in FIG. 1), user 105 is able to place desired pet accessories, desired personal items and empty waste-bags 107 in waste-bag-storage-cylinder 151 into storage pouch 186 via releasable opening 188 and place mini-pouch-body-assembly 180 on a waist by inserting a belt through pair of belt-loops 182. User 105 may alternately place mini-pouch-body-assembly 180 on pet leash 195 via pair of fastening-straps 190. Solid pet waste is placed in unused waste bag 107.

Top-edge 144 of front-panel 112 and top-edge 144 of rear-panel 114, being held in place by hook-and-loop, is able to be opened (an alternately closed by joining) by user 105 by separating top-edge 144 of front-panel 112 and top-edge 144 of rear-panel 114 to allow user 105 to place waste bags 107 when filled into panels-compartment-volume 122 created by separating top-edge 144 of front-panel 112 from top-edge 144 of rear-panel 114.

Pull-tab 130 on outside-surface 118 of front-panel 112 is able to be used by user 105 to quickly separate bottom edge 146 of front-panel 112 from bottom edge 146 of rear-panel 114 by pulling pull-tab 130 outward and releasing quick-release-opening-perimeter 120. Thus, user 105 is able to dispose of waste bags 107 when filled in a hands-free manner by allowing waste bags 107 when filled to fall out through pouch-opening 126 created by separating bottom edge 146 of front-panel 112 from bottom edge 146 of the rear-panel 114.

Figure 6A:
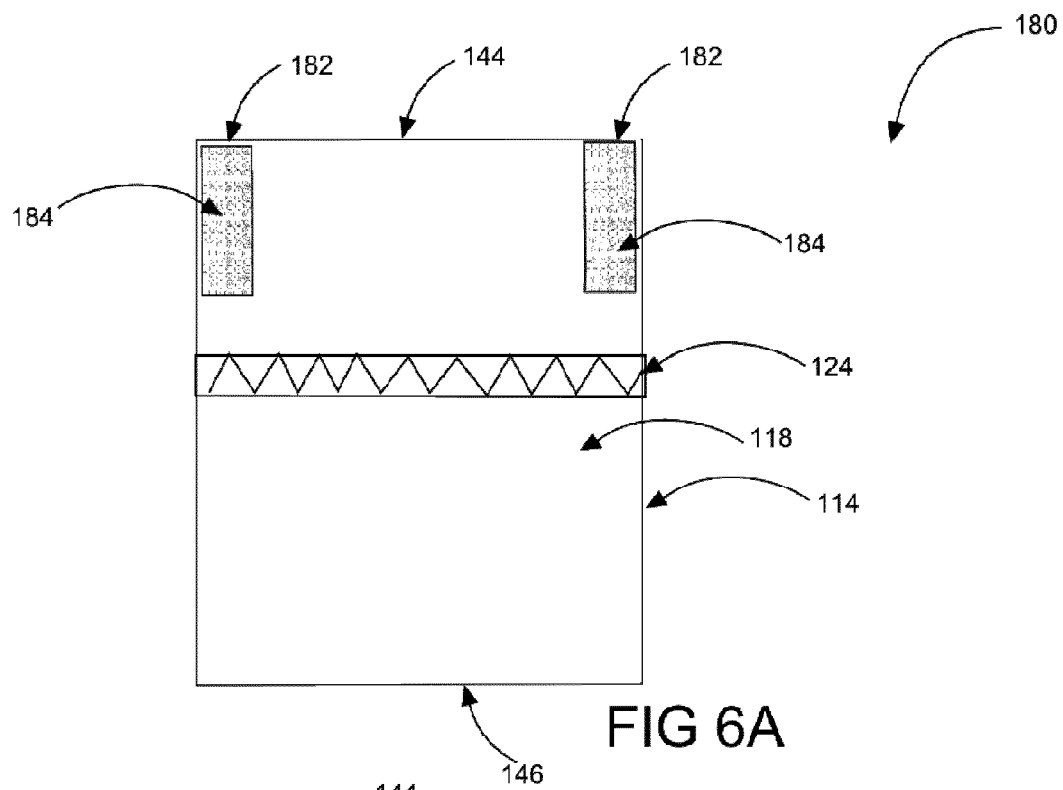
FIG. 6A is a perspective view illustrating an outside surface of a mini-body-assembly rear-panel according to an embodiment of the present invention of FIG. 5.

Referring now to FIG. 6A, a perspective view illustrating outside-surface 118 of mini-body-assembly 180 rear-panel 114 according to an embodiment of the present invention of FIG. 4.

Mini-pouch-body-assembly 180 may further comprise pair of belt-loops 182 in preferred embodiments. Pair of belt-loops 182 is fixedly attached to outside-surface 118 of rear-panel 114 having a connection means comprising hook-and-loop on top-surface 184. Pair of belt-loops 182 allows user 105 to wear mini-pouch-body-assembly 180 on a belt around a waist of user 105 by inserting a belt through each of belt-loops 182 or fastening straps 190.

Rear-panel 114 comprises reflective-safety-ribbon 124 fixedly attached to outside-surface 118 of rear-panel 114, reflective-safety-ribbon 124 able to be seen by motorists when user 105 is walking a pet during darkened conditions. This feature promotes safety in use.

Figure 6B:
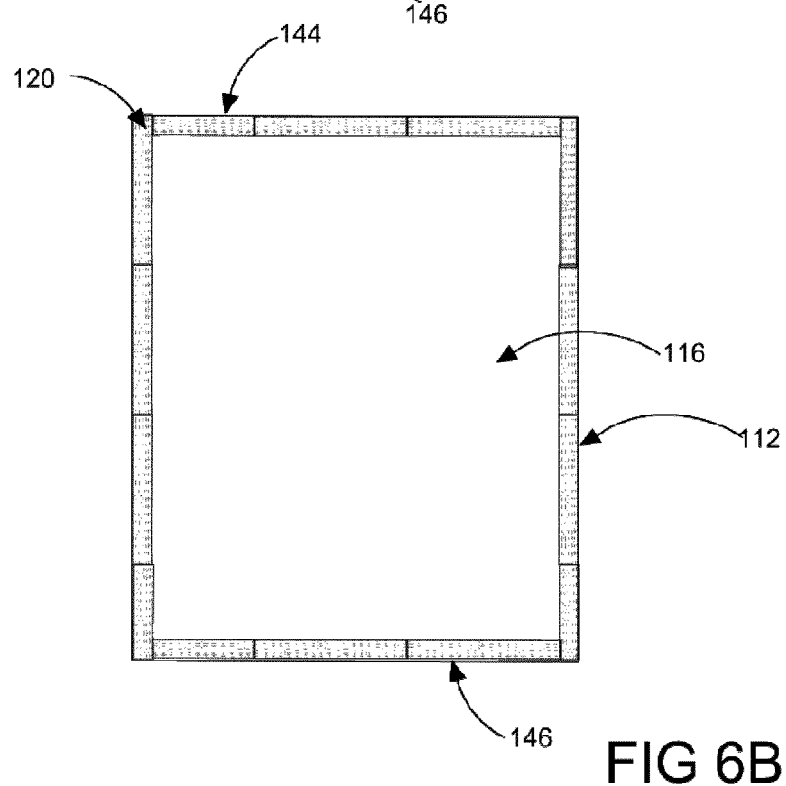
FIG. 6B is a perspective view illustrating an inside surface of a mini-body-assembly rear-panel according to an embodiment of the present invention of FIG. 5.

Referring now to FIG. 6B, a perspective view illustrating inside-surface 116 of mini-body-assembly 180 rear-panel 114 according to an embodiment of the present invention of FIG. 4. Inside-surface 116 of mini-body-assembly 180 rear-panel 114 comprises quick-release-opening-perimeter 120 comprising hook-and-loop surrounding inner-surface 116.

Figure 7A:
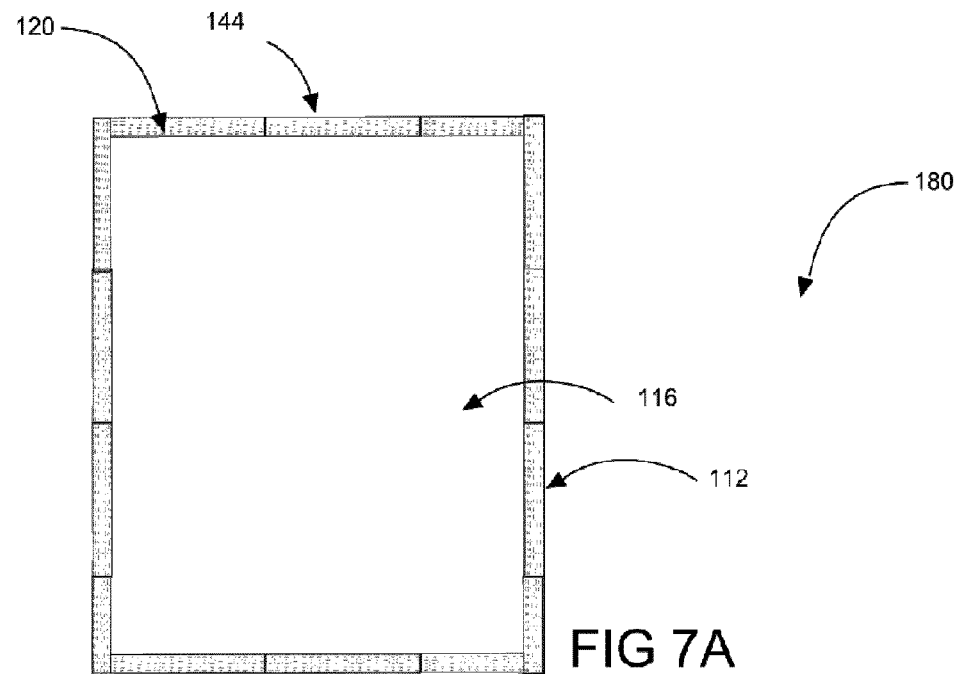
FIG. 7A is a perspective view illustrating an inside surface of a mini-body-assembly front-panel according to an embodiment of the present invention of FIG. 5.

Referring now to FIG. 7A, a perspective view illustrating inside-surface 116 of mini-body-assembly 180 front-panel 112 according to an embodiment of the present invention of FIG. 4. Inside-surface 116 of mini-body-assembly 180 front-panel 112 comprises quick-release-opening-perimeter 120 comprising hook-and-loop surrounding inner-surface 116. Hook and loop is the preferred fastening means since it can be coupled and uncoupled in quick succession with relative ease. Other fastening means will still be considered to fall within the scope of the disclosure of this present invention.

Figure 7B:
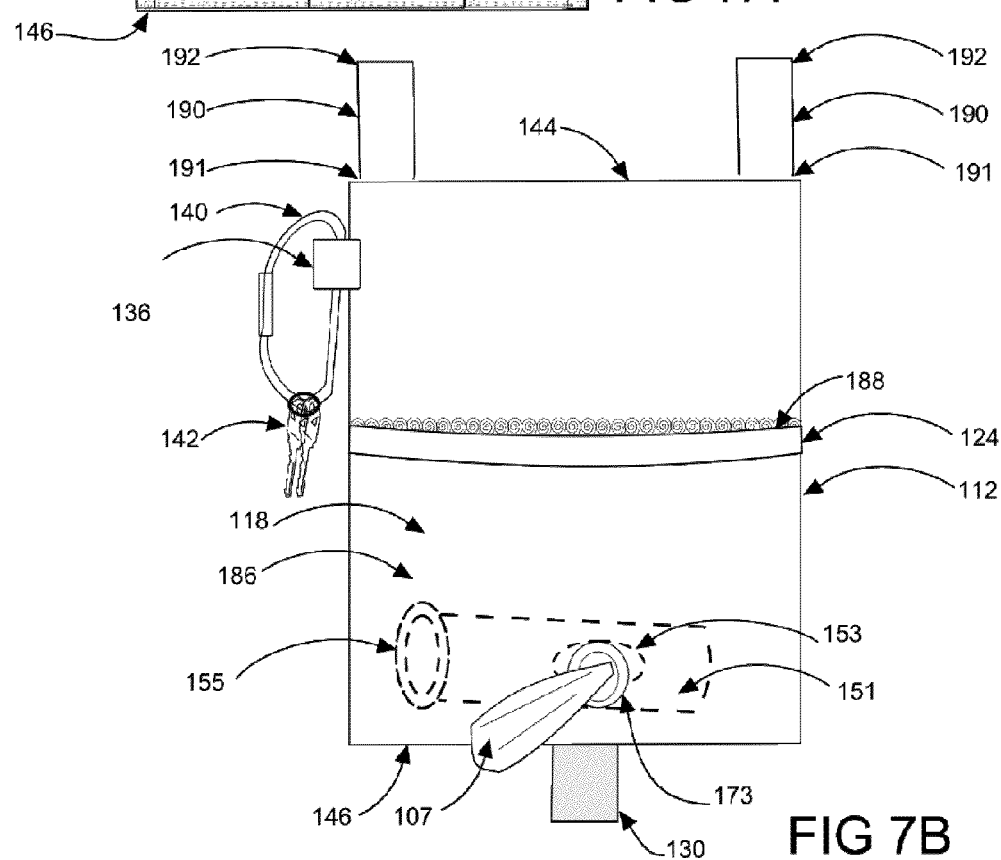
FIG. 7B is a perspective view illustrating an outside surface of a mini-body-assembly front-panel according to an embodiment of the present invention of FIG. 5.

Referring now to FIG. 7B, a perspective view illustrating outside-surface 118 of mini-body-assembly 180 front-panel 112 according to an embodiment of the present invention of FIG. 4.

Mini-pouch-body-assembly 180 further comprises pair of fastening-straps 190, each of fastening-straps 190 comprising strap-first-end 191 fixedly attached to outside-surface 118 of front-panel 112 and strap-second-end 192 releasably attachable via hook-and-loop to top-surface 184 of belt-loops 182 on outside-surface 118 of rear-panel 114. Pair of fastening-straps 190 is useful for suspending mini-pouch-body-assembly 180 from pet leash 195.

Storage pouch 186 on front-panel 112 having releasable opening 188 and dispenser-eyelet 173 accessed via releasable opening 188 comprising hook-and-loop is useful for storing unused collection bags 107 in waste-bag-storage-cylinder 151 and retrieving them one-by-one delivered in pseudo-linked series through dispenser-eyelet 173 measuring approximately ¾ inch. Storage pouch 186 also holds personal items, pet accessories, and waste-bag-storage-cylinder horizontally 151. Unused waste bags 107 kept in waste-bag-storage-cylinder 151 having a cylindrical shape with a volume, side centered cylinder-opening 153, and cylinder cap 155 are useful for holding pet-waste as needed. The present invention promotes ease of use for dispensing unused collection bags 107 via a novel means, as described. Side-loop 136 on a side of front-panel 112 having loop-opening 138 holding spring lock 140 is useful for holding ring of keys 142, another unique feature.

Deluxe-pouch-body-assembly 110 may be sold as kit 440 comprising the following parts: at least one front-panel 112 having plurality of compartments 160, at least one rear-panel 114; at least one spring-lock 140; at least one waste-bag-storage-cylinder 151 having side centered cylinder-opening 153, with cylinder cap 155; and at least one set of user instructions. Alternately, mini-pouch-body-assembly 180 may be sold as kit 440 comprising the following parts: front-panel 112, at least one rear-panel 114; at least one spring-lock 140; at least one waste-bag-storage-cylinder 151 having side centered-cylinder-opening 153, with cylinder cap 155; and at least one set of user instructions.

The kit has instructions such that functional relationships are detailed in relation to the structure of the invention (such that the invention can be used, maintained, or the like in a preferred manner). Pet waste and personal items pouch system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized pouches, different fastener/fastening combinations, parts may be sold separately, etc., may be sufficient.

Figure 8:
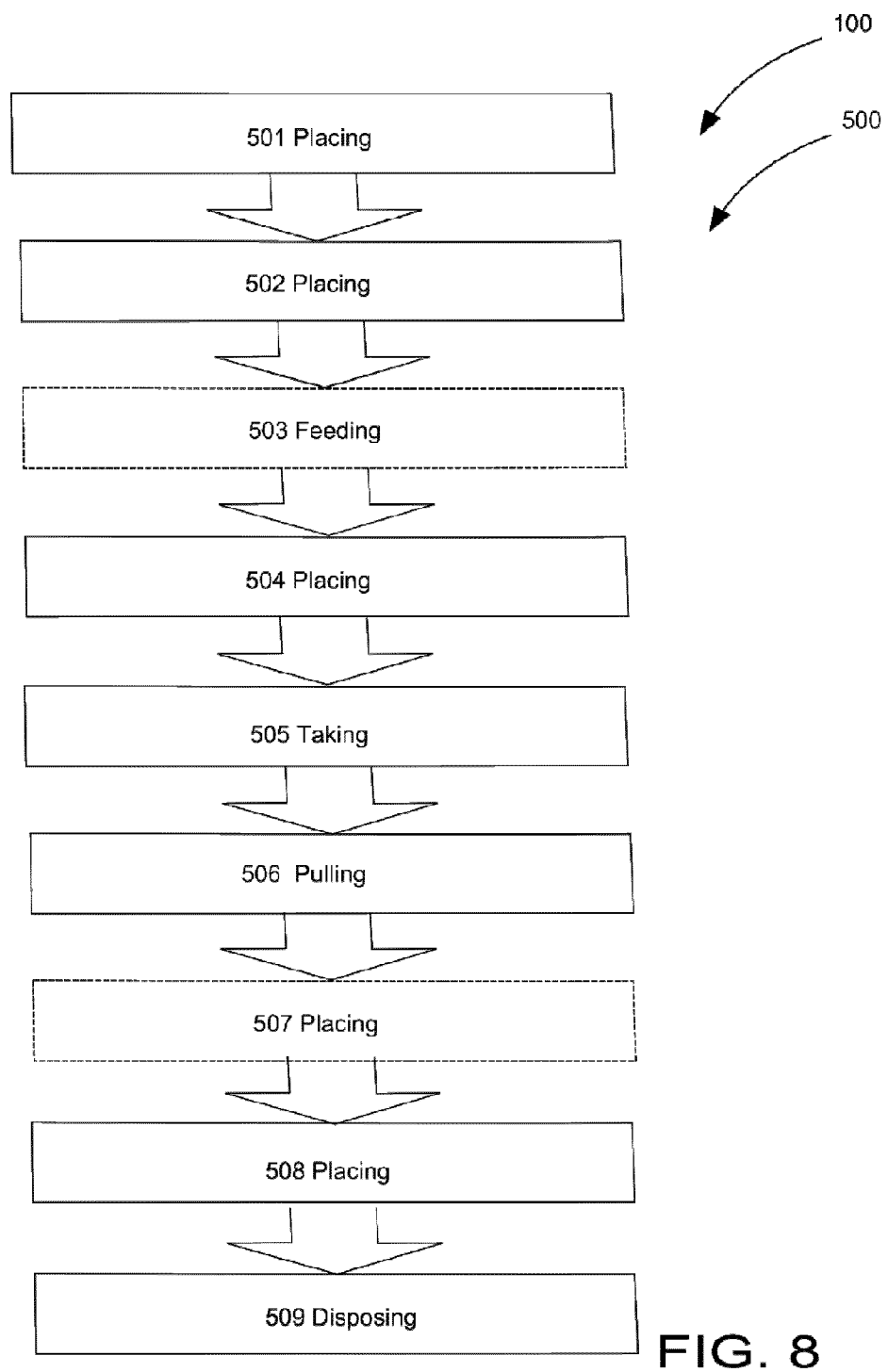
FIG. 8 is a flowchart illustrating a method of use for the pet waste and personal items pouch system according to an embodiment of the present invention of FIGS. 1-7B.

Referring now to FIG. 8, a flowchart illustrating a method of use 500 for pet waste and personal items pouch system 100 according to an embodiment of the present invention of FIGS. 1-6B.

Method of use 500 for pet waste and personal items pouch system 100 preferably comprises the steps of: step one 501 placing personal items and pet accessories in plurality of compartments 160, step two 502 placing waste-bag-storage-cylinder 151 containing empty waste-bags 107 in third-compartment 170, step three 503 feeding empty waste-bag 107 through dispenser-eyelet 173, step four 504 placing deluxe-pouch-body-assembly 110 on a belt via plurality of fastening-straps 190, step five 505 taking a pet for a walk, step six 506 pulling empty waste-bag 107 from dispenser-eyelet 173 when needed, step seven 507 placing pet waste is waste-bag 107, step eight 508 placing waste-bag 107 when filled into panels-compartment-volume 122 via quick-release-opening-perimeter 120 by separating top-edge 144 of front-panel 112 from top-edge 144 of rear-panel, and step nine 509 disposing of filled waste-bag when desired through quick-release-opening-perimeter 120 by separating bottom-edge 146 of front-panel 112 from bottom-edge 146 of rear-panel 114 via pull-tab 130. Methods of using may slightly differ between the various embodiments and alluded to previously.

It should be noted that the steps described in the method of use could be carried out in many different orders according to user preference. The use of "step of" should not be interpreted as "step for", in the claims herein and is not intended to invoke the provisions of 35 U.S.C. §112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A pet waste and personal items pouch system comprising:
    a deluxe-body-assembly comprising;
    a front-panel and a rear-panel, each having an inside surface, an outside surface, and a quick-release-opening-perimeter comprising a fastener of hook-and-loop on said inside surface;
    a plurality of compartments on said outside surface of said front-panel;
    a pull-tab on said outside-surface of said front-panel; and
    a plurality of fastening-straps;
    wherein said front-panel and said rear-panel each comprise a reflective-safety-ribbon fixedly attached to said outside-surface of said front-panel and said outside-surface of said rear-panel, said reflective-safety-ribbon able to be visually seen by motorists when said user is walking a pet during darkened conditions;
    wherein said plurality of compartments on said outside-surface of said front-panel are able to contain empty waste bags, pet accessories and personal items as per user-preference;
    wherein said plurality of compartments on said outside-surface of said front-panel comprises at least a first-compartment, a second-compartment, a third-compartment, and a fourth-compartment;
    wherein said first-compartment comprises a first-compartment-opening comprising hook and loop closure and a first-compartment-inner-volume able to contain desired said personal items;
    wherein said second-compartment adjacent to said first-compartment comprises a second-compartment-opening having a fastening means and a second-compartment-inner-volume able to contain desired said personal items;
    wherein said second-compartment comprises a mesh-front-surface enabling said user to see said personal items contained within said second-compartment-inner-volume;
    wherein said third-compartment comprises a third-compartment-opening comprising hook and loop closure and a third compartment-inner-volume containing unused waste bags;
    wherein said third-compartment comprises a dispenser-eyelet through which said unused waste bags are contained and capable of being pulled one-by-one delivered in a pseudo- linked series from a waste-bag-storage-cylinder placed horizontally in said third- compartment-inner-volume, said unused waste bags useful for holding pet-waste as needed;
    wherein said waste-bag-storage-cylinder comprises a tubular shaped cylinder having a cylinder-volume, a cylinder-bottom-surface, a side centered-cylinder- opening, and a cylinder cap fitting on a cylinder-top-opening;
    wherein said fourth-compartment comprises a fourth-compartment-opening comprising hook and loop closure and a fourth-compartment-inner-volume able to contain desired said personal items;
    wherein a top-edge of said front-panel and a top-edge of said rear-panel being held together is able to be opened by separating said top-edge of said front-panel and said top-edge of said rear-panel to allow said user to place said waste bags when filled into a quick-release panels-compartment-volume created between the front-panel and the rear-panel when said user separates said top-edge of said front-panel from said top-edge of said rear-panel;
    wherein said pull-tab on said outside-surface of said front-panel is configured to be used by a user to quickly separate said front-panel from said rear-panel by pulling said pull-tab and releasing said quick-release-opening-perimeter;
    wherein said pull-tab on said outside-surface of said front-panel is configured to separate a bottom-edge of said front-panel and a bottom-edge of said rear-panel to dispose of said waste bags when filled;
    wherein a side-loop on a side of said front-panel comprises an opening for holding a spring lock useful for holding a ring of keys;
    wherein said user is able to insert a belt through said plurality of fastening- straps to wear said pouch-body-assembly on a waist of said user, or pets leash and take a pet for a walk having easy access to said empty waste bags, when needed;

wherein said user is able to place desired said pet accessories and desired said personal items into said plurality of compartments as desired; and wherein said user is able to place said pet waste in said waste bag into said quick-release panels-compartment-volume for later disposal.

* * * * *